(12) United States Patent
Harada et al.

(10) Patent No.: US 12,309,092 B2
(45) Date of Patent: May 20, 2025

(54) TERMINAL

(71) Applicant: NTT DOCOMO, INC., Tokyo (JP)

(72) Inventors: Hiroki Harada, Tokyo (JP); Satoshi Nagata, Tokyo (JP); Yuki Matsumura, Tokyo (JP); Shohei Yoshioka, Tokyo (JP); Hideyuki Moroga, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 585 days.

(21) Appl. No.: 17/597,142

(22) PCT Filed: Jun. 26, 2019

(86) PCT No.: PCT/JP2019/025504
§ 371 (c)(1),
(2) Date: Dec. 27, 2021

(87) PCT Pub. No.: WO2020/261463
PCT Pub. Date: Dec. 30, 2020

(65) Prior Publication Data
US 2022/0321299 A1   Oct. 6, 2022

(51) Int. Cl.
*H04L 5/00* (2006.01)
(52) U.S. Cl.
CPC .................. *H04L 5/0051* (2013.01)
(58) Field of Classification Search
CPC .................................................... H04L 5/0051
See application file for complete search history.

(56) References Cited

U.S. PATENT DOCUMENTS

| | | | |
|---|---|---|---|
| 2012/0099666 A1* | 4/2012 | Baldemair | H04L 27/2617 375/260 |
| 2019/0081844 A1 | 3/2019 | Lee et al. | |
| 2020/0127776 A1* | 4/2020 | Maki | H04L 27/364 |
| 2020/0295979 A1* | 9/2020 | Saito | H04W 72/23 |
| 2020/0304259 A1* | 9/2020 | Ihalainen | H04L 5/0051 |
| 2020/0412590 A1* | 12/2020 | Akkarakaran | H04L 27/26136 |
| 2021/0167925 A1* | 6/2021 | Qi | H04L 5/0053 |
| 2022/0078767 A1* | 3/2022 | Xiong | H04L 5/0092 |

OTHER PUBLICATIONS

Samsung, "Design considerations and requirements beyond 52.6 GHz", 3GPP TSG-RAN Meeting #84, Newport Beach, USA, Jun. 3-6, 2019, RP-191186 (Year: 2019).*
Intel Corporation, "New SID: Study on NR beyond 52.6 GHz", 3GPP TSG RAN Meeting #80, La Jolla, USA, Jun. 11-14, 2018, RP-181417 (Year: 2018).*
3GPP TR 38.807 V0.2.0 (Jun. 2019), Technical Report, 3rd Generation Partnership Project; Technical Specification Group Radio Access Network; Study on requirements for NR beyond 52.6 GHz (Release 16); Jun. 7, 2019 (Year: 2019).*

(Continued)

*Primary Examiner* — Joseph A Bednash
(74) *Attorney, Agent, or Firm* — Osha Bergman Watanabe & Burton LLP

(57) ABSTRACT

When using a different frequency band such as FR4, which is different from a frequency band including FR1 and FR2, the terminal uses a phase tracking reference signal (PTRS) having a different density in at least one of a time direction and a frequency direction to perform transmission or reception of a signal using the PTRS.

4 Claims, 9 Drawing Sheets

(56) References Cited

OTHER PUBLICATIONS

International Search Report issued in PCT/JP2019/025504, mailed on Dec. 24, 2019 (5 pages).
Written Opinion of the International Searching Authority issued in PCT/JP2019/025504, mailed on Dec. 24, 2019 (5 pages).
3GPP TR 38.807 V0.1.0; "3rd Generation Partnership Project; Technical Specification Group Radio Access Network; Study on requirements for NR beyond 52.6 GHz (Release 16)"; Mar. 2019 (44 pages).

* cited by examiner

☒ : CORESET
◩ : DMRS
▨ : PDSCH time density = 8 (for 28 symbol slot or 2 slots)

▨ : PDCCH
▩ : DMRS for PDSCH
▦ : PTRS

TERMINAL

TECHNICAL FIELD

The present invention relates to a terminal that performs wireless communication, and more particularly, relates to a terminal that uses a phase tracking reference signal (PTRS).

BACKGROUND ART

The 3rd Generation Partnership Project (3GPP) specifies Long Term Evolution (LTE), and with the aim of further speeding, specifies LTE-Advanced (hereinbelow, the LTE includes the LTE-Advanced). In the 3GPP, specifications for 5th generation mobile communication system (5G, also called as New Radio (NR) or Next Generation (NG)) are also being considered.

In Release 15 and Release 16 (NR) of the 3GPP, the operation up to 6 GHz is specified. In addition, in the specifications after Release 16, operation in a band exceeding 52.6 GHz has been studied (see Non-Patent Document 1). The target frequency range in Study Item (SI) is 52.6 GHz to 114.25 GHz.

When the carrier frequency is high like this, an increase in phase noise becomes a problem. Therefore, in NR, for the purpose of estimating phase noise which is a problem in such a high frequency band, a phase tracking reference signal (PTRS: Phase Tracking RS) as a reference signal (RS) for each terminal (User Equipment, UE) is newly defined.

Specifically, in Frequency Range 2 (FR2, 24.25 GHz to 52.6 GHz), it is stipulated that one port Downlink (DL)/ Uplink (UL) PTRS should be used. In FR1 (410 MHz to 7.125 GHz), PTRS is an option.

However, if the carrier frequency exceeds 52.6 GHz, the increase in phase noise and propagation loss becomes a more serious problem. It is also more sensitive to Peak-to-Average Power Ratio (PAPR) and power amplifier nonlinearity.

To solve this problem, one approach is to apply Cyclic Prefix-Orthogonal Frequency Division Multiplexing (CP-OFDM)/Discrete Fourier Transform-Spread (DFT-S-OFDM) with larger Sub-Carrier Spacing (SCS).

PRIOR ART DOCUMENT

Non-Patent Document

Non-Patent Document 1: 3GPP TR 38.807 V0.1.0, 3rd Generation Partnership Project; Technical Specification Group Radio Access Network; Study on requirements for NR beyond 52.6 GHz (Release 16), 3GPP, March 2019

SUMMARY OF THE INVENTION

However, when using a high frequency band exceeding 52.6 GHz, the currently defined PTRS configuration may not necessarily be optimal. Specifically, considering the application of CP-OFDM or DFT-S-OFDM having a larger SCS as described above, the maximum number of Fast Fourier Transform (FFT) points (that is, Physical Resource Block (PRB) may be less than FR1/FR2.

In other words, the density of PTRS in the time direction and the frequency direction is not necessarily appropriate when using a different frequency band different from FR1/FR2, such as a high frequency band exceeding 52.6 GHz, and may cause unnecessary large overhead. Moreover, PTRS (DL PTRS) for downlink (DL) currently defined is applied only to CP-OFDM.

The present invention has been made in view of the above discussion. One object of the present invention is to provide a terminal that can use an appropriate phase tracking reference signal (PTRS) configuration even when using a different frequency band different from FR1/FR2.

According to one aspect of the present disclosure a terminal (UE 200) includes a receiving unit (control signal/ reference signal processing unit 240) that receives, when using transform precoding in a different frequency band (e.g., FR4) different from a certain frequency band (FR1, FR2) including one or a plurality of frequency ranges, a phase tracking reference signal (PTRS) associated with the transform precoding; and a control unit (control unit 270) that processes a received signal by using the phase tracking reference signal.

According to another aspect of the present disclosure a terminal (UE 200) includes a control unit (control unit 270) that uses, when using a different frequency band (e.g., FR4) different from a certain frequency band (FR1, FR2) including one or more frequency ranges, a phase tracking reference signal (PTRS) having a density in at least one of a time direction and a frequency direction different from the case of using the certain frequency band; and a transmitting and receiving unit (radio signal transmitting and receiving unit 210) that transmits or receives a signal using the phase tracking reference signal.

MODES FOR CARRYING OUT THE INVENTION

Figure 1:
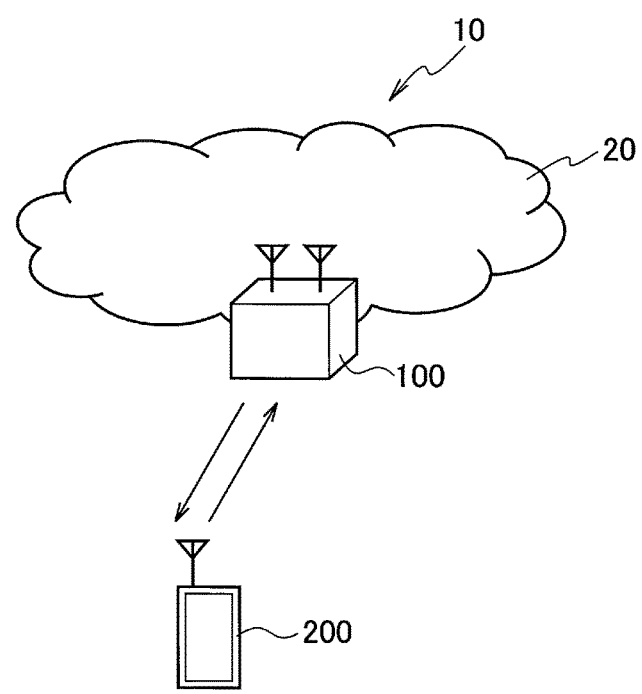
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR). The radio communication system 10 includes Next Generation-Radio Access Network 20 (hereinafter, "NG-RAN 20") and a terminal 200 (hereinafter, "UE 200").

The NG-RAN 20 includes a radio base station 100 (hereinafter, "gNB 100"). A concrete configuration of the radio communication system 10, including the number of the gNBs and the UEs, is not limited to the example shown in FIG. 1.

The NG-RAN 20 actually includes a plurality of NG-RAN Nodes, in particular, the gNBs (or ng-eNB). Also, the NG-RAN 20 is connected to a core network (5GC, not shown) according to the 5G. The NG-RAN 20 and the 5GC may be simply expressed as "network".

The gNB 100 is a radio base station according to the 5G. The gNB 100 performs a radio communication with the UE 200 according to the 5G. The gNB 100 and the UE 200 can handle, by controlling a radio signal transmitted from a plurality of antenna elements, Massive MIMO (Multiple-Input Multiple-Output) that generates a beam with a higher directivity, carrier aggregation (CA) that bundles a plurality of component carriers (CC) to use, dual connectivity (DC) in which communication is performed simultaneously between two NG-RAN Nodes and the UE, and the like.

Figure 2:
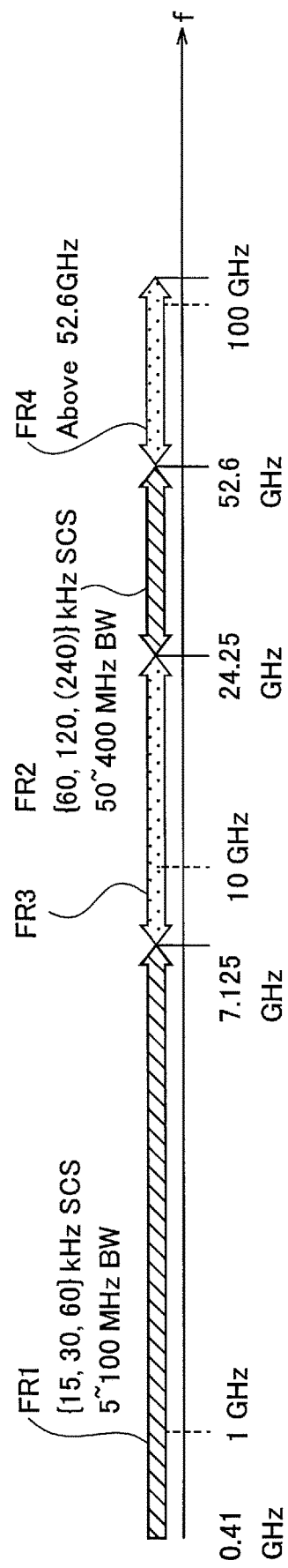
FIG. 2 is a diagram showing a frequency range used in the radio communication system 10.

The radio communication system 10 corresponds to a plurality of frequency ranges (FR). FIG. 2 shows the frequency range used in the radio communication system 10.

As shown in FIG. 2, the radio communication system 10 corresponds to FR1 and FR2. The frequency band of each FR is as below.

FR1: 410 MHz to 7.125 GHz
FR2: 24.25 GHz to 52.6 GHz

In FR1, 15 kHz, 30 kHz, or 60 kHz Sub-Carrier Spacing (SCS) is used, and a bandwidth (BW) of 5 MHz to 100 MHz is used. FR2 has a higher frequency than FR1. Moreover, FR2 uses SCS of 60 kHz or 120 kHz (240 kHz may be included), and uses a bandwidth (BW) of 50 MHz to 400 MHz.

Note that SCS may be interpreted as numerology. The numerology is defined in 3GPP T538.300 and corresponds to one subcarrier spacing in the frequency domain.

Furthermore, the radio communication system 10 can handle to a frequency band that is higher than the frequency band of FR2. Specifically, the radio communication system 10 can handle a frequency band exceeding 52.6 GHz and up to 114.25 GHz. Here, such a high frequency band is referred to as "FR4" for convenience. FR4 belongs to so-called EHF (extremely high frequency, also called millimeter wave). FR4 is a temporary name and may be called by another name.

FR4 may be further classified. For example, FR4 may be divided into a frequency range of 70 GHz or less and a frequency range of 70 GHz or more. Alternatively, FR4 may be divided into more frequency ranges, and may be divided in frequencies other than 70 GHz.

Here, the frequency band between FR2 and FR4 is referred to as "FR3" for convenience. FR3 is a frequency band above 7.125 GHz and below 24.25 GHz.

In the present embodiment, FR3 and FR4 are different from the frequency band including FR1 and FR2, and are called different frequency bands.

Particularly, as described above, in a high frequency band such as FR4, an increase in phase noise between carriers becomes a problem. This may require application of a larger (wider) SCS or a single carrier waveform.

Also, a narrower beam (i.e., a larger number of beams) may be required due to increased propagation loss. In addition, since it is more sensitive to PAPR and power amplifier nonlinearity, a greater (wider) SCS (and/or fewer FFT points), a PAPR reduction mechanism, or a single carrier waveform may be required.

In order to address these issues, in this embodiment, when using a band exceeding 52.6 GHz, Cyclic Prefix-Orthogonal Frequency Division Multiplexing (CP-OFDM)/Discrete Fourier Transform having a larger Sub-Carrier Spacing (SCS)-Spread (DFT-S-OFDM) can be applied.

However, the larger the SCS, the shorter the symbol/Cyclic Prefix (CP) period and the slot period (when the 14 symbol/slot configuration is maintained).

Figure 3:
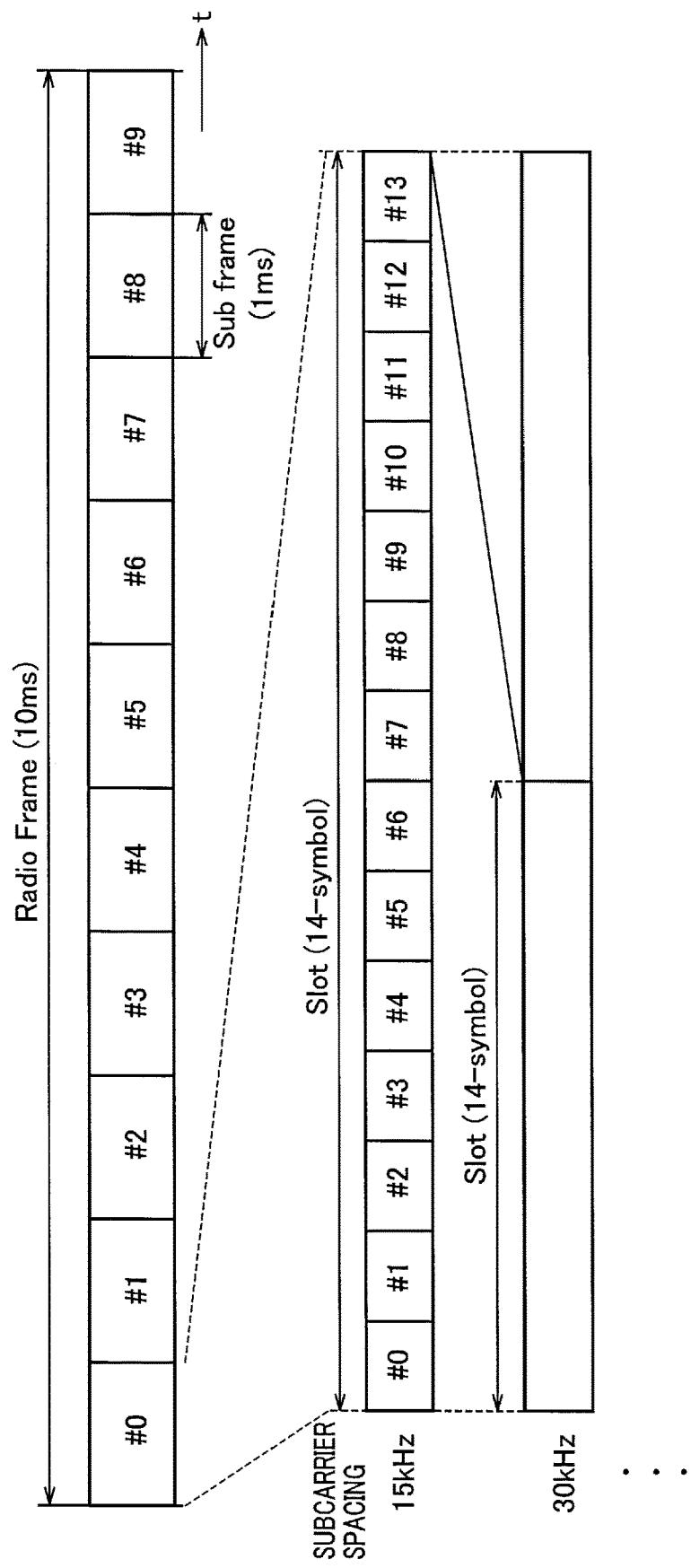
FIG. 3 is a diagram illustrating a configuration example of a radio frame, subframes, and slots used in the radio communication system 10.

FIG. 3 shows a configuration example of a radio frame, subframes, and slots used in the radio communication system 10. Table 1 shows the relationship between the SCS and the symbol period.

TABLE 1

| | SCS | | | | | | |
|---|---|---|---|---|---|---|---|
| | 15 kHz | 30 kHz | 60 kHz | 120 kHz | 240 kHz | 480 kHz | 960 kHz |
| Symbol Period (Unit: μs) | 66.6 | 33.3 | 16.65 | 8.325 | 4.1625 | 2.08125 | 1.040625 |

As shown in Table 1, when the 14 symbol/slot configuration is maintained, the symbol period (and slot period) becomes shorter as the SCS becomes larger (wider).

In the present embodiment, even when the SCS is increased in this way, a mechanism capable of suppressing an increase in cost, complexity, and power consumption of the UE 200 is provided.

In the present embodiment, the phase tracking reference signal (PTRS) is used as an individual reference signal (RS) for each UE 200 for the purpose of estimating phase noise that is a problem in high frequency bands such as Particularly and FR4. Phase noise can be expressed as phase fluctuations caused by frequency components other than the carrier frequency in the local oscillation signal.

PTRS is preferably used in a frequency band of FR2 or higher, but may be used in FR3 (or FR1). In the present embodiment, the configuration of the PTRS to be used may vary depending on the frequency band.

(2) Functional Block Configuration of Radio Communication System

Next, a functional block configuration of the radio communication system 10 will be described. Specifically, the functional block configuration of the UE 200 will be described.

Figure 4:
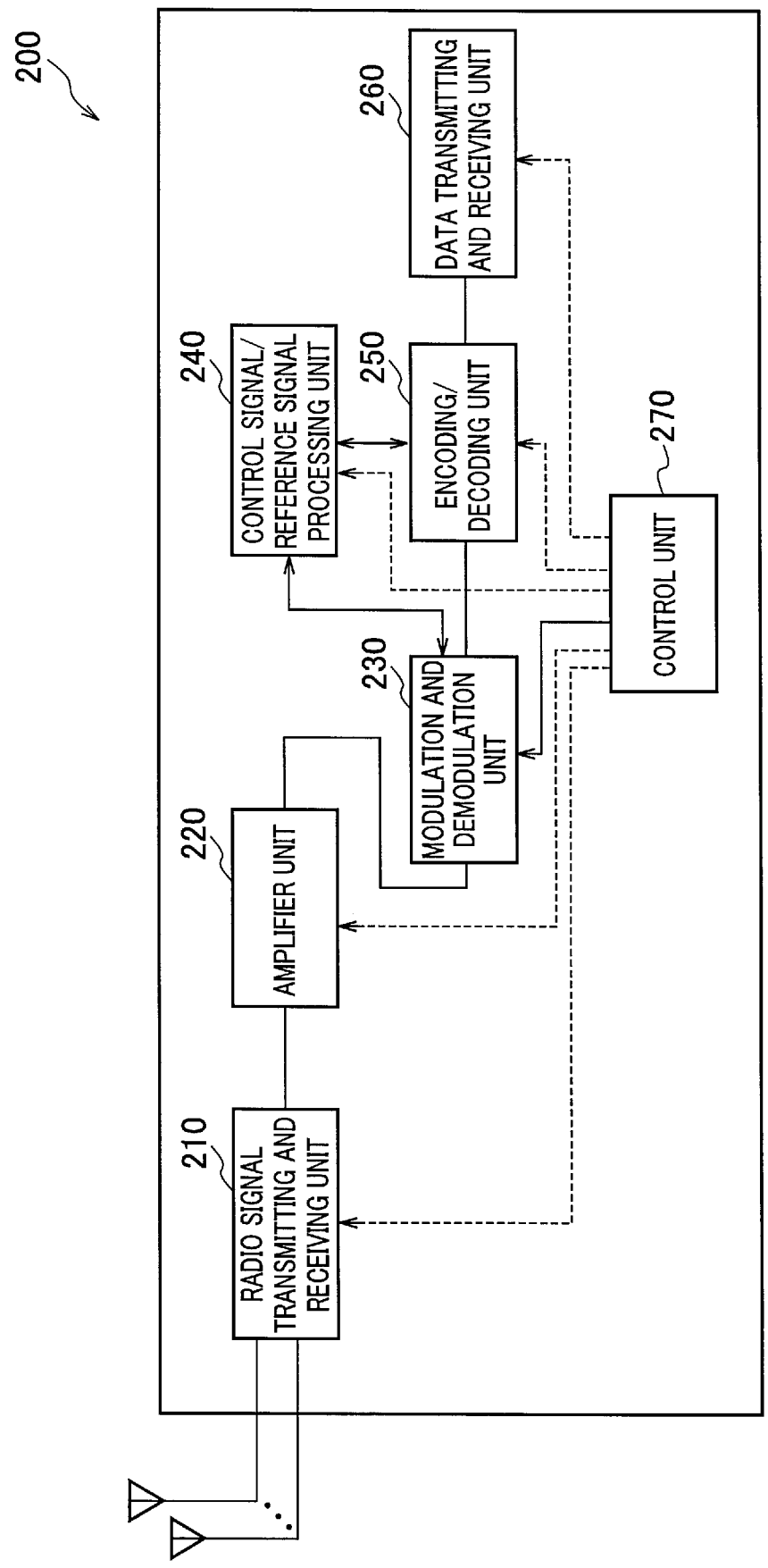
FIG. 4 is a functional block diagram of UE 200.

FIG. 4 is a functional block diagram of the UE 200. As shown in FIG. 4, the UE 200 includes a radio signal transmitting and receiving unit 210, an amplifier unit 220, a modulation and demodulation unit 230, a control signal/ reference signal processing unit 240, an encoding/decoding unit 250, a data transmitting and receiving unit 260, and a control unit 270.

The radio signal transmitting and receiving unit 210 transmits/receives a radio signal according to NR. The radio signal transmitting and receiving unit 210 corresponds to Massive MIMO, CA that bundles a plurality of CCs, and DC that performs communication simultaneously between the UE and each of the two NG-RAN Nodes.

Further, the radio signal transmitting and receiving unit 210 may transmit/receive a radio signal using a slot having a larger number of symbols than when FR1 or FR2 is used. Note that the number of symbols is specifically the number of OFDM symbols constituting the slot shown in FIG. 3.

For example, the radio signal transmitting and receiving unit 210 can transmit and receive a radio signal by using a slot having a 28 symbol/slot configuration.

In the present embodiment, the radio signal transmitting and receiving unit 210 constitutes a transmitting unit that transmits and/or receives a signal (specifically, radio signal) by using a PTRS (phase tracking reference signal).

The amplifier unit 220 includes a Power Amplifier (PA)/Low Noise Amplifier (LNA) or the like. The amplifier unit 220 amplifies the signal output from the modulation and demodulation unit 230 to a predetermined power level. The amplifier unit 220 amplifies the RF signal output from the radio signal transmitting and receiving unit 210.

The modulation and demodulation unit 230 executes data modulation/demodulation, transmission power setting, resource block allocation, and the like for each predetermined communication destination (gNB 100 or other gNB).

As explained above, in the present embodiment, CP-OFDM and DFT-S-OFDM can be applied. In DFT-S-OFDM, on the transmission side, precoding called transform precoding is executed by discrete Fourier transform (DFT) processing. For example, transform precoding is performed after modulation, layer mapping, and before multi-antenna precoding.

Note that, the transform precoding may be simply expressed as DFT precoding or precoding applied to DFT.

As explained above, in the present embodiment, CP-OFDM and DFT-S-OFDM can be applied. In the present embodiment, DFT-S-OFDM can be used not only for uplink (UL) but also for downlink (DL).

The control signal/reference signal processing unit 240 executes processing related to various control signals transmitted/received by the UE 200 and processing related to various reference signals transmitted/received by the UE 200.

Specifically, the control signal/reference signal processing unit 240 receives various control signals transmitted from the gNB 100 via a predetermined control channel, for example, a control signal of the radio resource control layer (RRC). The control signal/reference signal processing unit 240 transmits various control signals to the gNB 100 via a predetermined control channel.

The control signal/reference signal processing unit 240 executes processing by using reference signals (RS) such as demodulation reference signal (DMRS) and phase tracking reference signal (PRTS).

DMRS is a known reference signal (pilot signal) for estimating a fading channel used for data demodulation between a base station specific for a terminal and the terminal. PTRS is a terminal-specific reference signal for the purpose of estimating phase noise which is an issue in the high frequency band.

The reference signal includes, apart from DMRS and PTRS, Channel State Information-Reference Signal (CSI-RS) and Sounding Reference Signal (SRS).

A channel includes a control channel and a data channel. A control channel includes PDCCH (Physical Downlink Control Channel), PUCCH (Physical Uplink Control Channel), RACH (Random Access Channel, Downlink Control Information (DCI) including Random Access Radio Network Temporary Identifier (RA-RNTI)), and Physical Includes Broadcast Channel (PBCH).

A data channel includes PDSCH (Physical Downlink Shared Channel), PUSCH (Physical Downlink Shared Channel), and the like. Data means data transmitted via a data channel.

In the present embodiment, the control signal/reference signal processing unit 240 constitutes a receiving unit that receives PTRS associated with the transform precoding when transform Precoding (DFT) is used in a different frequency band (FR3, FR4) different from a frequency band including one or a plurality of frequency ranges (FR1, FR2).

Also, the PTRS is preferably present together with at least one of PDSCH (downlink data channel) and PUSCH (uplink data channel) in a specified resource block, specifically, a physical resource block (PRB) region.

The encoding/decoding unit 250 executes data division/concatenation and channel coding/decoding for each predetermined communication destination (gNB 100 or other gNB).

Specifically, the encoding/decoding unit 250 divides the data output from the data transmitting and receiving unit 260 into pieces of a predetermined size, and performs channel coding on the pieces of the data. The encoding/decoding unit 250 decodes the data output from the modulation and demodulation unit 230 and connects the decoded data.

The data transmitting and receiving unit 260 transmits and receives Protocol Data Unit (PDU) and Service Data Unit (SDU). Specifically, the data transmitting and receiving unit 260 executes PDU/SDU assembly/disassembly and the like in multiple layers (such as medium access control layer (MAC), radio link control layer (RLC), and packet data convergence protocol layer (PDCP)). The data transmitting and receiving unit 260 performs data error correction and retransmission control based on hybrid ARQ (Hybrid automatic repeat request).

The control unit 270 controls each functional block constituting the UE 200. Hereinafter, an outline of the functions of the control unit 270 will be described. Details of the operations of the UE 200 executed by the control unit 270 will be described later.

In the present embodiment, the control unit 270 processes the received signal by using the PTRS received from the gNB 100 by the control signal/reference signal processing unit 240. Specifically, the control unit 270 estimates the phase noise included in the received radio signal by using the received PTRS, and corrects the phase of the received radio signal based on the estimation result.

In the present embodiment, the control unit 270, when using a different frequency band (FR3, FR4) different from the frequency band including one or more frequency ranges (FR1, FR2), can use a different PTRS than when used in the frequency band, that is, FR1 and FR2, in which the density in at least one of the time direction and the frequency direction is different.

Specifically, the control unit 270 can select a configuration having different PTRS densities in at least one of the time direction and the frequency direction according to the frequency range to be used. The control unit 270 instructs the related functional block, such as the control signal/reference signal processing unit 240, to configure the PTRS.

(3) Operation of Radio Communication System

Next, an operation of the radio communication system 10 will be described. Specifically, an operation in which the UE 200 uses the PTRS (phase tracking reference signal) will be described.

In the following explanation of the operation, the frequency range (FR4) exceeding 52.6 GHz and up to 114.25 GHz will be described as an example, but the same PTRS configuration or PTRS processing can be applied to other frequency ranges such as FR3.

In the following description of the operation, in FR4, an appropriate setting parameter is defined for PTRS in DL/UL (hereinafter, DL/UL PTRS). This reduces DL/UL PTRS signaling overhead.

(3.1) Basic Structure of PTRS

First, a basic configuration of PTRS, including the contents specified in Release 15 of 3GPP, will be described. As explained above, Release 15 supports 1-port DL/UL PTRS. DL/UL PTRS is must for FR2 but optional for FR1. Support for 2-port UL PTRS and DL/UL PTRS density (time and frequency spacing) are optional.

The UE 200 reports a preferred Modulation and Coding Scheme (MCS) and bandwidth threshold to the network based on the UE's capability at the carrier frequency to be used.

DL PTRS has the following features.
Sequence generation: Same as DMRS in PDSCH
Density in the frequency direction (frequency density): {0, 2, 4} (which is a function of the scheduled bandwidth) Density in the time direction (time density): {0, 1, 2, 4} (which is a function of the scheduled MCS)
Resource element offset according to related DMRS antenna port is applied UL PTRS has the following characteristics.
When transform precoding is disabled, it is almost the same as DL PTRS
When transform precoding is enabled
PTRS group pattern applied (as a function of scheduled bandwidth)
Time density: {1, 2}

(3.1.1) Configuration Example of PTRS

Figure 5A:
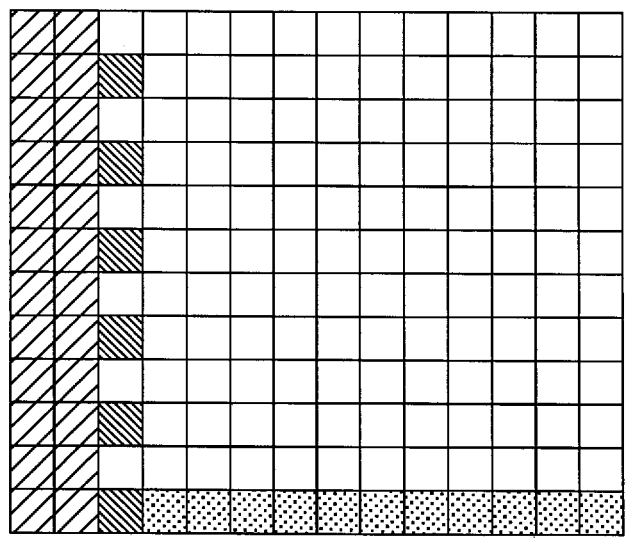
FIG. 5A is a diagram showing a configuration example ($L_{PT-RS}$: 1) of DL/UL PTRS for CP-OFDM.
Figure 5B:
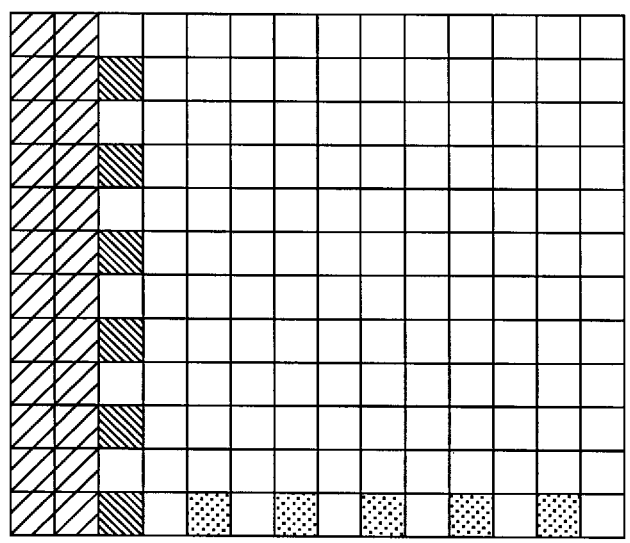
FIG. 5B is a diagram showing a configuration example ($L_{PT-RS}$: 2) of DL/UL PTRS for CP-OFDM.
Figure 5C:
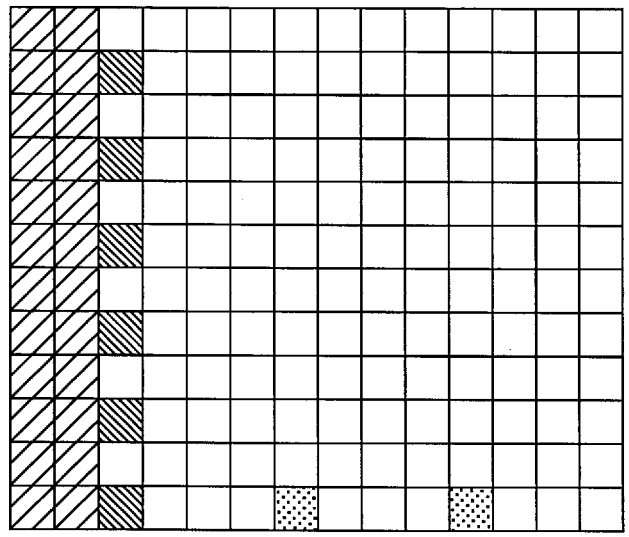
FIG. 5C is a diagram showing a configuration example ($L_{PT-RS}$: 4) of DL/UL PTRS for CP-OFDM.

FIG. 5A to FIG. 5C show a configuration example (part 1) of PTRS in accordance with the basic configuration of PTRS of Release 15 described above. Specifically, FIG. 5A shows a configuration example ($L_{PT-RS}$: 1) of DL/UL PTRS for CP-OFDM. As shown in FIG. 5A, within PRB (hereinafter, "RB") region, the PTRS time density ($L_{PT-RS}$) is "1", and PTRSs are arranged in all RBs (which may be expressed as a symbol) in the time direction (horizontal axis direction, hereinafter the same). On the other hand, the frequency density ($K_{PT-RS}$) of PTRS is "2", and the PTRS is arranged for every 2RBs (may be expressed as subcarriers) in the frequency direction (vertical axis direction, hereinafter the same). FIG. 5A to FIG. 5C also show the positions of DMRS for PDCCH and PDSCH.

$L_{PT-RS}$ and $K_{PT-RS}$ can be expressed as below:
$L_{PT-RS}$: 1 (ptrs-MCS3<=$I_{MCS}$<ptrs-MCS4)
$K_{PT-RS}$: 2 ($N_{RB0}$<=$N_{RB}$<$N_{RB1}$)

FIG. 5B shows a configuration example of DL/UL PTRS for CP-OFDM ($L_{PT-RS}$: 2), and FIG. 5C shows a configuration example of DL/UL PTRS for CP-OFDM ($L_{PT-RS}$: 4). In FIG. 5B, PTRS is arranged every 2RBs in the time direction. In FIG. 5C, PTRS is arranged every 4RBs in the time direction.

Figure 6:
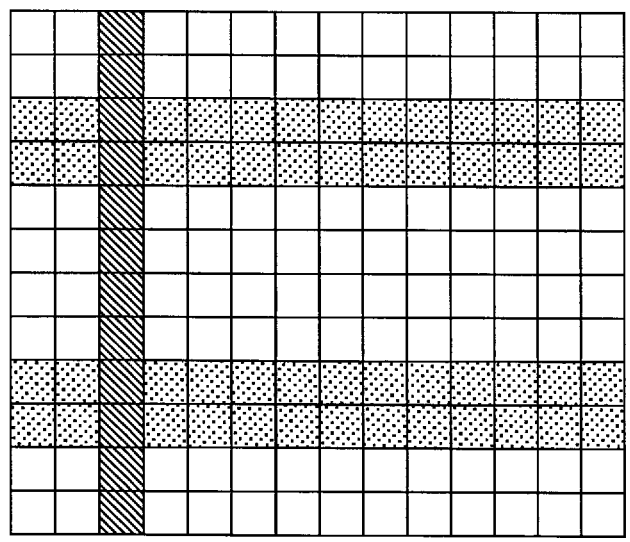
FIG. 6 is a diagram illustrating a configuration example of PTRS for DFT-S-OFDM.
Figure 6:
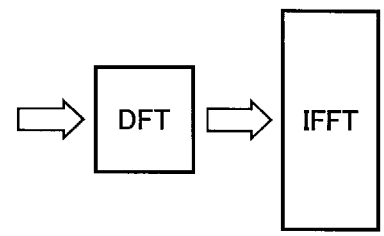

FIG. 6 shows a configuration example (part 2) of PTRS according to the basic configuration of PTRS in Release 15. Specifically, FIG. 6 shows a configuration example of PTRS for DFT-S-OFDM. The PTRS is assumed to be used in the UL.

As shown in FIG. 6, PTRS is inserted in the time domain before spreading by DFT. In the configuration example shown in FIG. 6, $L_{PT-RS}$ is "1", and the number of PTRS groups and the number of samples per PTRS group are "2" (written as {2, 2} ($N_{RB0}$<=$N_{RB}$<$N_{RB1}$)).

(3.1.2) Issues

When the PTRS configuration as described above is applied to a high frequency band such as FR4, the following problems may arise.
Phase noise further increases
Propagation loss is even greater, requiring a narrower beam (i.e., more beams)
More sensitive to PAPR and PA nonlinearity This requires a wider SCS (and/or a smaller number of FFT points), a PAPR reduction mechanism, or a single carrier waveform. Considering such issues, one possibility for waveforms in high frequency bands such as FR4 is the application of CP-OFDM or DFTS-OFDM with a wider SCS.

In particular, a comprehensive solution to follow phase noise using PTRS is more important in high frequency bands such as FR4 than FR1 and FR2.

In Release 15, DL PTRS is defined only for CP-OFDM waveforms. In Release 15, only limited values for some parameters (for example, frequency density and time density) are defined. Furthermore, in Release 15, PTRS is only available when set and setting is optional.

Further, as explained above, in the present embodiment, when using a high frequency band such as FR4, radio signals can be transmitted/received by using a slot having a larger number of symbols than when FR1 or FR2.

Figure 7:
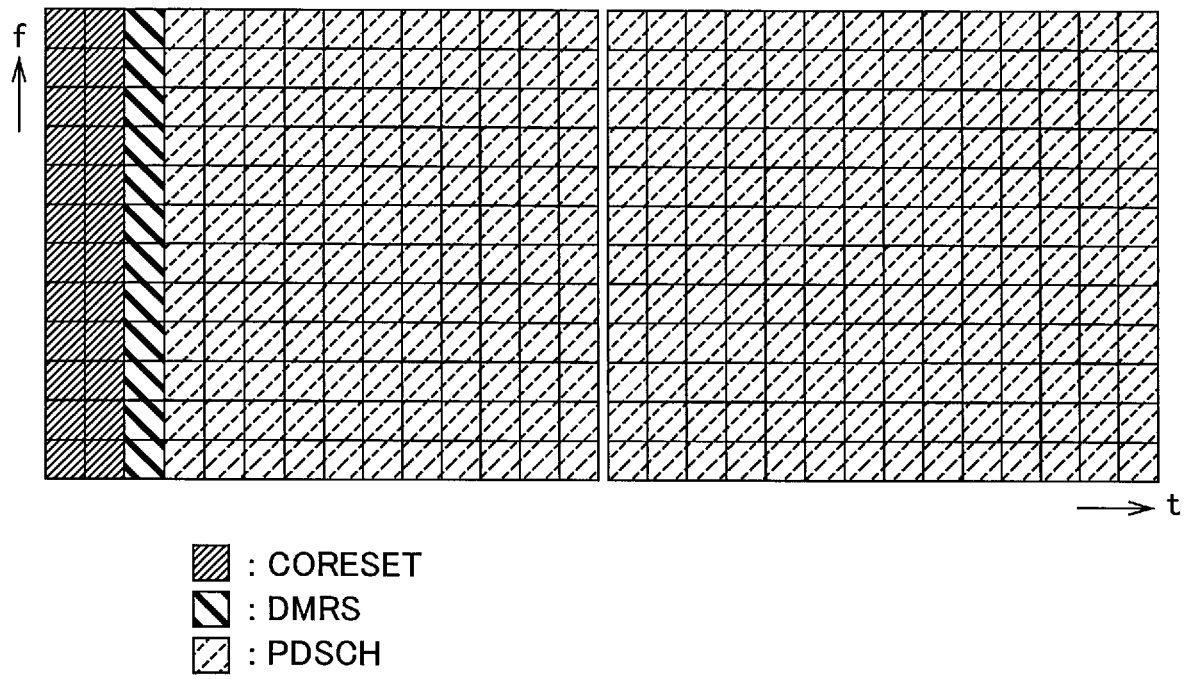
FIG. 7 is a diagram illustrating a configuration example of a slot in which the number of symbols (the number of OFDM symbols) constituting one slot is larger than 14 symbols.

FIG. 7 shows an example of a slot configuration in which the number of symbols (number of OFDM symbols) composing one slot (see FIG. 3) is greater than 14 symbols. Specifically, FIG. 7 shows a configuration example of 28 symbols/slot.

As shown in FIG. 7, when the slot is configured (horizontal axis direction) by 28 symbols (or 56 symbols etc.) that are more than 14 symbols, simply applying the PTRS time density ($L_{PT-RS}$) defined in Release 15 may cause an unnecessary large PTRS overhead.

Also, to reduce processing load at high frequencies, the maximum number of FFT points (that is, the maximum number of PRBs) may be smaller than when FR1 or FR2 is. In this case, the frequency density of $K_{PT-RS}$ may be excessive in $K_{PT-RS}$ having the above values (0, 2, 4).

(3.2) Proposal

Next, a proposal for PTRS configuration that can solve the above-described problems will be described. In the following explanation, the following three proposals are included assuming application to a high frequency band such as FR4 (however, application to other frequency ranges such as FR3 is not excluded).

(Proposal 1): Define DL PTRS configuration when transform precoding is enabled
(Proposal 2): Introducing new frequency density and time density in DL/UL PTRS
(Proposal 3): When transmitting/receiving PDSCH/PUSCH, it is assumed that DL/UL PTRS exists at the same time.

Regarding (Proposal 1), support by DL PTRS terminal (UE) for DFT-S-OFDM is mandatory or conditional.

Regarding (Proposal 2), for example, in the case of CP-OFDM, the time density ($L_{PT-RS}$) is set to "4" or more, or "1".

Regarding (Proposal 3), this assumption is applied even during the initial access (initial access) of the UE.

Details of (Proposal 1) to (Proposal 3) will be described below.

(3.2.1) Proposal 1

When defining the DL PTRS configuration when transform precoding is enabled, by changing the UL PTRS configuration for transform precoding applied to FR1 or FR2, DL PTRS for transform precoding applied to FR4 can be configured.

Specifically, M^{PUSCH}_{sc} (see Chapter 6.4.1.2.2.2 of TS38.211) may be replaced with the number of PDSCH subcarriers.

In addition, the candidate value of time density may be expanded to include a value larger than "2", and the candidate value of the number of samples per PTRS group (M^{group}_{samp}) may be expanded to include "1".

Further, a larger number of orthogonal sequences may be defined (for example, in the case of Multi User (MU)-MIMO in DL). For example, M^{group}_{samp} of Chapter 6.4.1.2.1.2 of TS38.211 can includes "8" and $n_{RNTI}$ mod N^{group}_{samp} can include 4 to 7.

(3.2.2) Proposal 2

When introducing new frequency and time densities in DL/UL PTRS, there can be two situations: when CP-OFDM is used (i.e., when transform precoding is disabled), and when DFT-S-OFDM is used (i.e., when transform precoding is enabled).

(3.2.2.1) When CP-OFDM is Used

The candidate value of time density ($L_{PT-RS}$ may be extended to include a value (for example, 8) larger than "4". The purpose is to reduce the PTRS overhead in the time domain.

For example, in the case of a large SCS (e.g., 960 kHz), the maximum candidate value may be greater than "4". As explained above, in the case of a large SCS, the existing $L_{PT-RS}$ values (0, 2, 4) may cause the PTRS time density to be too high. By setting $L_{PT-RS}>4$, PTRS can be prevented from entering too much in the time direction.

Further, the frequency density ($K_{PT-RS}$) candidate value may also be extended to include a value larger than "4". The purpose is to reduce PTRS overhead in the frequency domain.

For example, when the maximum number of PRBs to which PDSCH/PUSCH is allocated is smaller than the number of PRBs when FR1 or FR2 is used, $K_{PT-RS}$ may be larger than "4".

Thus, when using a high frequency band such as FR4, by reducing the time density and frequency density of DL/UL PTRS, overhead due to PTRS transmission can be reduced and frequency utilization efficiency can be improved.

On the other hand, the candidate value of frequency density ($K_{PT-RS}$) may be expanded to include "1". By increasing the PTRS density in the frequency domain, the phase tracking performance can be improved even when there is a reduction in PTRS time density.

For example, in the case of CP-OFDM (and DFT-S-OFDM may be included), the DL/UL PTRS configuration example (mapping) in this proposal may use the PTRS group as a base in the time domain and/or frequency domain. In this case, a plurality of consecutive subcarriers and/or symbols may carry PTRS (or may not include PTRS) at predetermined intervals in the time domain and/or frequency domain.

Figure 8:
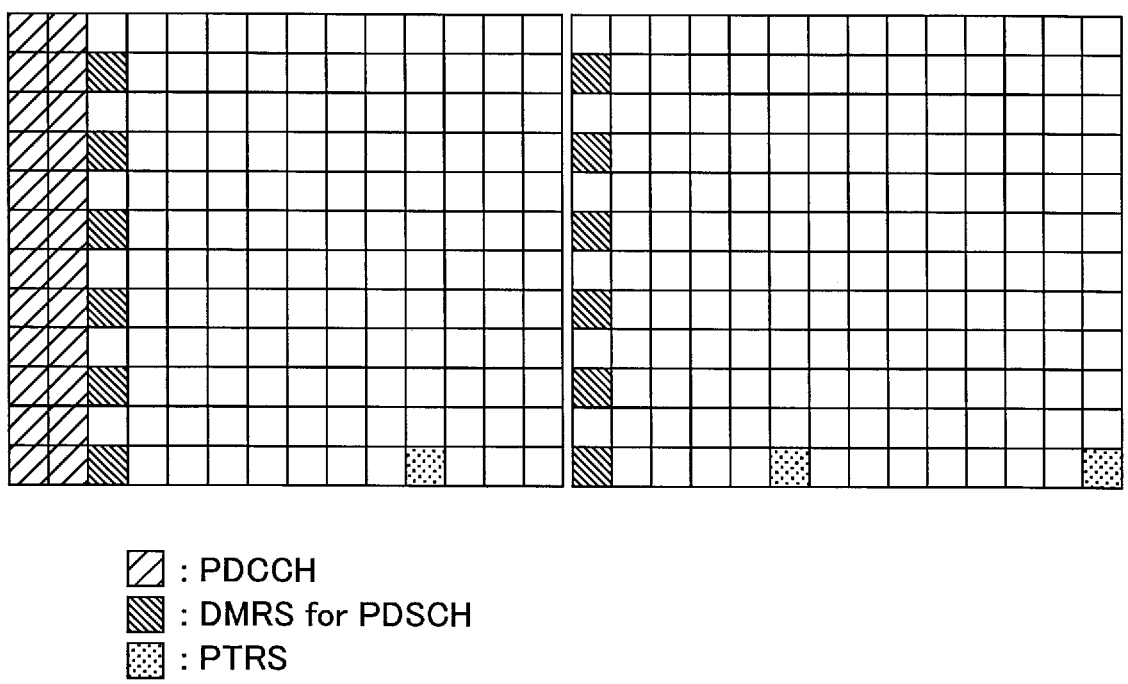
FIG. 8 is a diagram showing a configuration example (part 1) of DL/UL PTRS in "Proposal 2".
Figure 9:
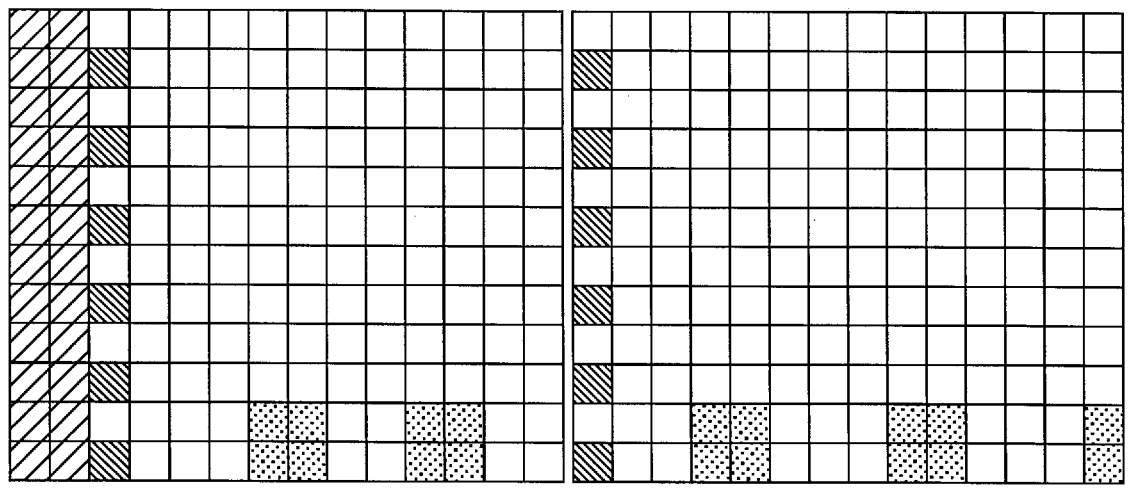
FIG. 9 is a diagram showing a configuration example (part 2) of DL/UL PTRS "Proposal 2".

FIG. 8 and FIG. 9 show DL/UL PTRS configuration examples (Nos. 1 and 2) in (Proposal 2). Specifically, FIG. 8 shows the case where the time density ($L_{PT-RS}$) is "8", FIG. 9 shows that the time density ($L_{PT-RS}$) is "4", and the PTRS group is constituted by two PTRSs (sample).

FIG. 8 and FIG. 9 both show a 28-symbol/slot configuration, and show two slots.

In the configuration example shown in FIG. 8, the time density is simply expanded to "8", and PTRS is arranged every eight RBs. On the other hand, in the configuration example shown in FIG. 9, in the time domain, PTRSs are arranged every four RBs, and two PTRSs are arranged continuously. Such arrangement of PTRS in the time domain cannot be realized with the conventional PTRS configuration (see FIGS. 5A to 5C and 6).

(3.2.2.2) When DFT-S-OFDM is Used

The candidate value of time density ($L_{PT-RS}$) may be expanded to include a value larger than "2". The purpose is to reduce the PTRS overhead in the time domain.

For example, in the case of a large SCS (e.g., 960 kHz), the maximum candidate value may be greater than "2". This is because, as in the case of CP-OFDM, the existing $L_{PT-RS}$ values (1, 2) may cause the PTRS time density to be too high.

Further, the candidate value for the number of samples per PTRS group may be expanded to include "1". The purpose is to reduce the PTRS overhead in the time domain and/or frequency domain.

The configuration example (mapping) of DL/UL PTRS in this proposal, that is, when using DFT-S-OFDM, may be based on a PTRS group in the time domain. In this case, a plurality of consecutive symbols may carry PTRS (or may not include PTRS) at predetermined intervals in the time domain before spreading by DFT.

(3.2.2.3) Other

In the case of the present proposal, the setting value of the time density and/or the frequency density may be expanded or limited according to the SCS, the carrier frequency, or a combination thereof.

For example, when SCS larger than FR2 is applied to FR4, the time density may be increased and the frequency density may be decreased while continuing using the existing PTRS configuration.

Alternatively, if the same SCS as FR2 is applied to FR4, the time density is limited only to a smaller value, e.g., "1" (and "2"), and the frequency density may be expanded to support a larger value, e.g., "8".

(3.2.3) Proposal 3

When transmitting/receiving PDSCH/PUSCH in FR4, each terminal (UE) may assume that DL/UL PTRS always exists together with PDSCH/PUSCH.

In this proposal, the DL/UL PTRS (1 port or 2 port) support of the terminal is preferably required for a high frequency band such as FR4 regardless of the presence or absence of terminal capability signaling.

For example, the terminal may assume that "phaseTrackingRS" is always set in DMRS-DownlinkConfig IE and DMRS-UplinkConfig IE (see 3GPP TS38.331, etc.).

In the case of PDSCH/PUSCH used in the initial access and RRC reconfiguration procedures, the default PTRS configuration is used.

Specifically, in the case of Remaining Minimum System Information (RMSI) PDSCH, the default PTRS configuration is defined in advance by specifications. For other PDSCH/PUSCH, the default PTRS configuration may be pre-defined by the specification or may be configured by RMSI (SIB1).

Further, any of the following options may be applied.

(Option 1): Support PTRS transmission for initial access, system information, and paging message transmission
PTRS can be set by default, specification by specification, or based on a notification by system information (for example, SIB1, Master Information Block (MIB))
If PTRS is also supported by SS/PBCH Block (SSB) or Physical Broadcast Channel (PBCH), SSB uses a specific configuration defined by the specification
Depending on the system information, PTRS transmission may be further enabled or disabled, or when multiple PTRS settings are specified, which setting is to be used can be dynamically instructed
If RNTI is equal to RA-RNTI, System Information (SI)-RNTI, Temporary Cell (TC)-RNTI, or Paging (P)-RNTI (or any group-common RNTI), the terminal supposes that PTRS exists (Option 2): Not support PTRS transmission for initial access, system information, and paging message transmission
If RNTI is equal to RA-RNTI, SI-RNTI or P-RNTI, the terminal assumes that PTRS does not exist
For contention-based PUSCH scheduled by RA-RNTI or rescheduled by TC-RNTI, the terminal assumes that PTRS does not exist
In case of contention-free PUSCH scheduled by RA-RNTI or rescheduled by C-RNTI or MCS-C-RNTI, the terminal assumes that PTRS does not exist, or assumes that PTRS exists based on the upper layer setting (Other options): If the phaseTrackingRS in DMRS-DownlinkConfig and DMRS-UplinkConfig or DMRS-DownlinkConfig has not been set, the terminal assumes that PTRS always exists according to the predefined default settings (this option is also applicable to other than initial access)

In this case, the default setting (parameter) in the time domain may be any of the following:
Most dense pattern: Enables good phase tracking (correction) (performance improvement)
Least sparse pattern: reduce PTRS overhead (low data coding rate)

Also, the default setting (parameter) in the frequency domain may be the most dense pattern or the least sparse pattern as in the time domain. The expected effect is the same.

Further, when phaseTrackingRS is not set in DMRS-UplinkConfig or DMRS-DownlinkConfig, the terminal may assume as below:
If the allocated frequency resource exceeds the predetermined number (M PRBs), it is assumed that PTRS always exists, otherwise PTRS does not exist, that is, PTRS is not required in the frequency domain in case of narrow band
If the allocated time resource exceeds the predetermined number (M PRBs), it is assumed that PTRS always exists; otherwise, it is assumed that PTRS does not exist, that is, when the number of symbols is small, PTRS is not required in the time domain
If the data coding rate is less than the predetermined value (X), it is assumed that PTRS always exists; otherwise, it is assumed that PTRS does not exist, that is, by assuming that PTRS does not exist, the data coding rate can be lowered
If the MCS index is greater than the predetermined value (m) (e.g., the modulation order reported by the MCS index is more than QPSK), it is assumed that PTRS always exists, otherwise it is assumed that PTRS does not exist, that is, more PTRSs are required in multi-level modulation (4) Advantageous Effects According to the above-described embodiment, the following effects can be achieved. Specifically, according to the UE 200, when transform precoding is used in a high frequency band such as FR4, that is, when DFT-S-OFDM is used, DL PTRS associated with the transform precoding is received, and the received signal can be processed using the received DL PTRS.

Also, according to the UE 200, when a high frequency band such as FR4 is used, a PTRS having a density in at least one of the time direction and the frequency direction different from that used for FR1/FR2 can be used.

For this reason, the UE 200 can use an appropriate PTRS configuration even when using a different frequency band different from FR1/FR2.

As explained above, simply applying the PTRS time density ($L_{PT\text{-}RS}$) specified in Release 15 may cause unnecessary large PTRS overhead; however, such overhead can be reliably avoided.

In addition, the maximum number of FFT points (that is, the maximum number of PRBs) may be smaller than when FR1 or FR2 is used. In this case, $K_{PT\text{-}RS}$ with the values (0, 2, 4) as described above may be excessive, but according to the UE 200, placement of such excessive PTRS on the PRB is avoided. Therefore, unnecessary large PTRS overhead does not occur.

In the present embodiment, PTRS may exist with at least one of PDSCH and PUSCH. Thereby, the UE 200 can recognize presence of PTRS reliably and easily.

(5) Other Embodiments

Although the contents of the present invention have been described by way of the embodiments, it is obvious to those skilled in the art that the present invention is not limited to what is written here and that various modifications and improvements thereof are possible.

For example, in the above embodiment, a high frequency band such as FR4, that is, a frequency band exceeding 52.6 GHz has been described as an example; however, it is allowable to apply at least one of the above-described (Proposal 1) to (Proposal 3) to other frequency ranges such as FR3.

Furthermore, as explained above, FR4 may be divided into a frequency range of 70 GHz or lower and a frequency range of 70 GHz or higher. FR4 can be applied to the frequency range of 70 GHz or higher (Proposal 1) to (Proposal 3), and the correspondence between the proposal and the frequency range may be changed as appropriate, for example, the proposal can be partially applied to the frequency range.

Moreover, the block diagram used for explaining the embodiments (FIG. 4) shows blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 10:
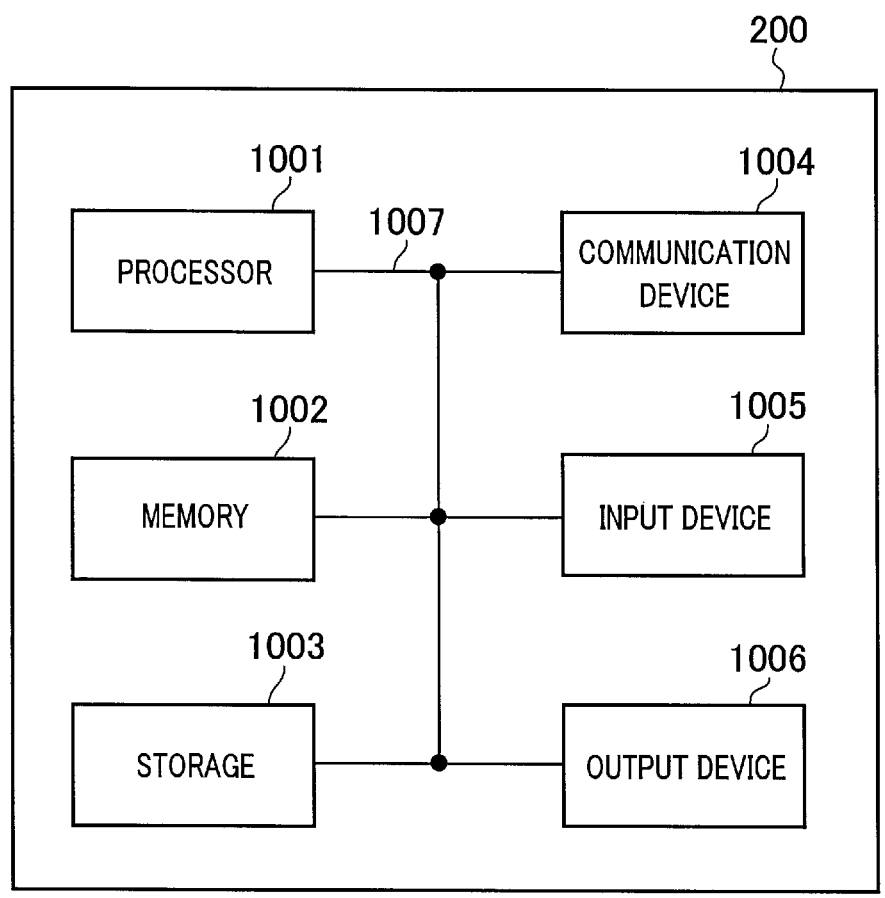
FIG. 10 is a diagram illustrating an example of hardware configuration of the UE 200.

Furthermore, the UE 200 explained above can function as a computer that performs the processing of the radio communication method of the present disclosure. FIG. is a diagram showing an example of a hardware configuration of the UE 200. As shown in FIG. 10, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the UE 200 (see FIG. 4) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station. A radio frame may be composed of one or more frames in the time domain. Each frame or frames in the time domain may be referred to as a subframe. A subframe may be further configured by one or more slots in the time domain. The subframe may have a fixed time length (e.g., 1 ms) that does not depend on the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in a time unit larger than a minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one between a subframe and TTI may be a subframe (1 ms) in existing LTE, or may be shorter than 1 ms (for example, 1 to 13 symbols), or a period longer than 1 ms. Note that, a unit representing TTI may be called a slot, a minislot, or the like instead of a subframe.

Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. Further, the number of slots (the number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, a common RB may be specified by RB index based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgement" and "decision" may include considering some operation as "judged" and "decided". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
210 Radio signal transmitting and receiving unit
220 Amplifier unit
230 Modulation and demodulation unit
240 Control signal/reference signal processing unit
250 Encoding/decoding unit
260 Data transmitting and receiving unit
270 Control unit
1001 Processor
1002 Memory
1003 Storage
1004 Communication device
1005 Input device
1006 Output device
1007 Bus

The invention claimed is:

1. A terminal comprising:
a receiver that receives, when using transform precoding in a secondary frequency band having a higher frequency range than a first frequency band, a phase tracking reference signal associated with the transform precoding; and
a processor that processes a received signal by using the phase tracking reference signal,
wherein an interval in time direction of the phase tracking reference signal in the secondary frequency band is greater than a maximum interval in time direction of the phase tracking reference signal in the first frequency band.

2. The terminal as claimed in claim 1, wherein a time density of the phase tracking reference signal in the secondary frequency band is smaller than a time density in the first frequency band, and wherein the time density is a function of a modulation and coding scheme.

3. The terminal as claimed in claim 2, wherein the density in the time direction is a function of a modulation and coding scheme, and the density in the frequency direction is a function of a scheduled bandwidth of the first frequency band.

4. The terminal as claimed in claim 1, wherein the phase tracking reference signal is present together with at least one of a downlink data channel and an uplink data channel within a defined resource block region.

* * * * *